July 27, 1965 L. H. THOMAS, SR 3,196,576
LIVE BAIT CONTAINER
Filed Nov. 8, 1962 2 Sheets-Sheet 2
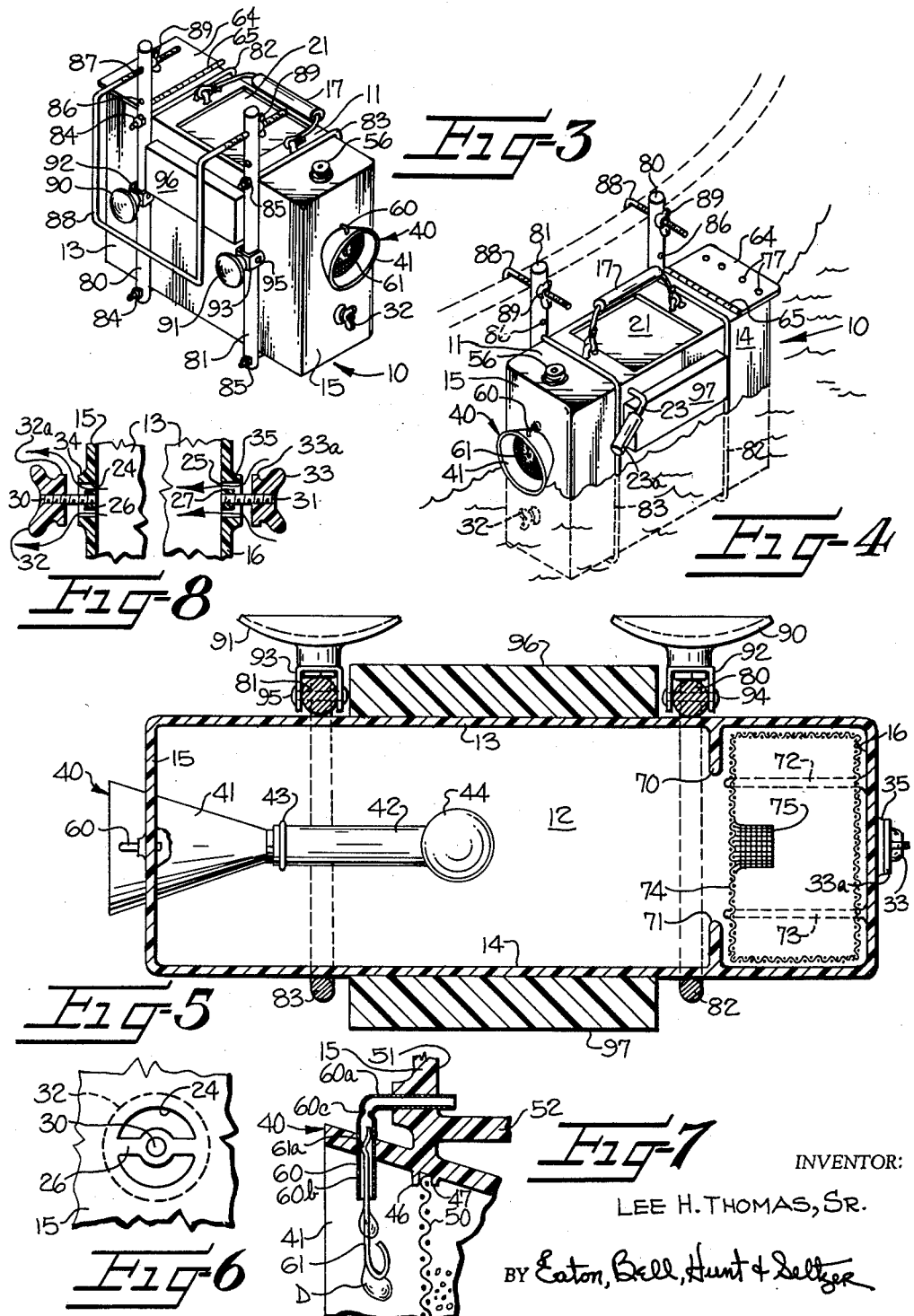
INVENTOR:
LEE H. THOMAS, SR.
BY Eaton, Bell, Hunt & Seltzer
ATTORNEYS United States Patent Office 3,196,576
Patented July 27, 1965

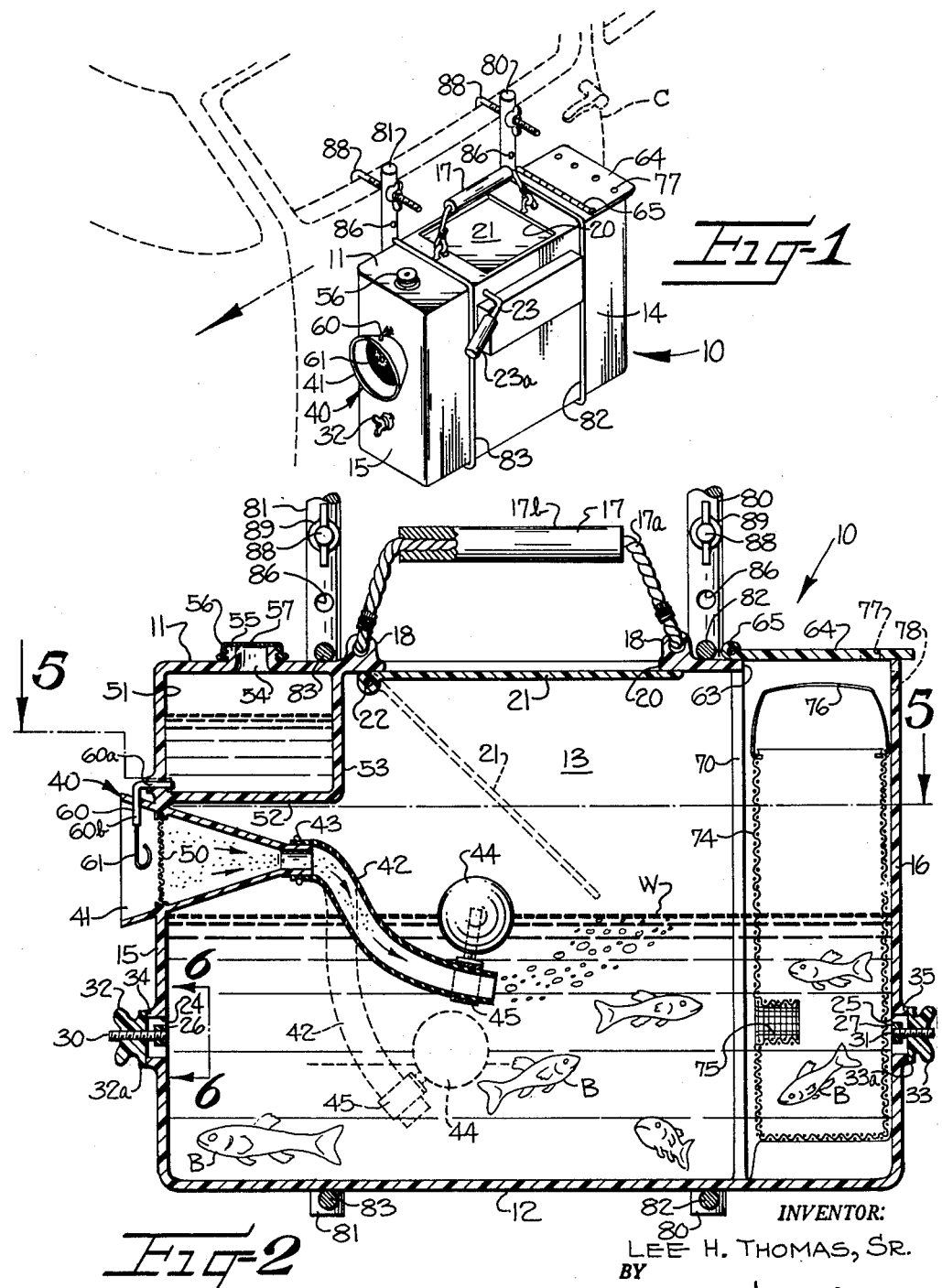

3,196,576
LIVE BAIT CONTAINER
Lee H. Thomas, Sr., 52 Courtney Drive, Charleston, S.C.
Filed Nov. 8, 1962, Ser. No. 236,778
9 Claims. (Cl. 43—56)

The present invention relates to containers for live bait, such as minnows, shrimp and the like, and more particularly to such a container adapted to be mounted on a vehicle for transporting such live bait from a considerable distance to the fishing site while the water therein is maintained in a fresh condition, and is adapted to be mounted on a variety of sizes and shapes of boats in such a manner that the water therein is maintained in a fresh condition during fishing.

As is well known, to properly maintain minnows, shrimp and the like alive during transport to the fishing site and during fishing, the water in which such bait is disposed must be maintained in a cool state. It is noted that on a relatively warm day, particularly in summertime, the water within a bait container may readily reach such a temperature that the bait therein will become sick, or even die.

Also, it is well known that such bait removes oxygen from the water in which the same is disposed and, unless a fresh supply of water is continuously placed in the bait container or the oxygen removed by the bait is replenished, the live bait will suffocate and die.

With the foregoing in mind, it is an object of the present invention to provide an improved live bait container of the type adapted to transport live bait a considerable distance to the fishing site and wherein water contained therein is aerated by an air stream directed thereinto and an air coolant is directed into the stream prior to its entry into the container to cool the air stream which then maintains the water in the container sufficiently cool and aerated to maintain the bait in a live condition.

A more specific object of the present invention is to provide an improved container for live bait which is readily mountable on a vehicle for transporting such live bait from a considerable distance to the fishing site with means for aerating water in the container by the direction of an air stream into the water upon movement of the vehicle upon which the container is mounted and wherein means is provided for dispensing metered quantities of fresh water into such air stream prior to its entry into the container for cooling the air stream due to the evaporation of said metered quantities of water for cooling the water in the container as well as replenishing the oxygen in the water which has been removed by the live bait.

A further more specific object of the present invention is to provide a live bait container of the character described wherein the air stream is directed into the water in the container at a predetermined depth regardless of the amount of water in the container to provide optimum aeration thereof.

A further object of the present invention is to provide a container for live bait of the character described which is readily mountable on a variety of shapes and sizes of boats and is adapted to be partially submerged in the water in which the boat is disposed and including valve means in the container movable to an open position to permit fresh water to flow into the container to maintain the bait in a live condition during fishing.

A still more specific object of the present invention is to provide a live bait container of the character last described wherein the valve means are constructed and arranged to prevent the direct flow of water into the container to prevent undue turbulence being created therein.

A still further more specific object of the present invention is to provide a live bait container of the character described including removable means for entrapping some of the bait to present a readily accessible supply to the fisherman.

Some of the objects of the invention having been stated, other objects will appear as the description proceeds, when taken in connection with the accompanying drawings, in which:

FIGURE 1 is a perspective view of the bait container of the present invention shown mounted on a suitable vehicle which is shown in dotted lines;

FIGURE 2 is a longitudinal vertical section taken substantially medially through the bait container shown in FIGURE 1;

FIGURE 3 is a perspective view of the bait container looking from the opposite side from that shown in FIGURE 1;

FIGURE 4 is a view similar to FIGURE 1 with the bait container shown mounted on a boat which is shown in dotted lines and with the bait container partially submerged in water;

FIGURE 5 is a horizontal section taken substantially along line 5—5 in FIGURE 2;

FIGURE 6 is a fragmentary detail looking in the direction of the arrows 6—6 in FIGURE 2;

FIGURE 7 is an enlarged fragmentary sectional view showing details of the aerating device shown in FIGURE 2;

FIGURE 8 is an enlarged fragmentary sectional detail of the valve mechanisms shown in FIGURE 2 with the valves shown in open position.

Referring now to the drawings, and more particularly to FIGURE 1, there is shown a bait container generally indicated at 10 incorporating the features of the present invention. Bait container 10 is preferably constructed of molded plastic-like material having integrally formed top, bottom, side and end walls 11, 12, 13, 14, 15 and 16, respectively, defining a main chamber adapted to contain water W and live bait B in the lower portion thereof. It should be noted, however, that bait container 10 may be formed of any suitable material and the walls thereof may be suitably connected together rather than formed integrally.

A handle 17 is formed of a rope 17a fastened at each end to eyelets or hooks 18 mounted on top wall 11 and a sleeve 17b surrounding the medial portion of rope 17a for facilitating carrying bait container 10. The top wall 11 has a first opening 20 (FIGURE 2) formed therein for providing access to the interior of the container 10, which access opening is normally closed by a gate 21 pivotally mounted on the underside of top wall 11 by a hinge 22. A handle 23 (FIGURE 1) is connected to gate 21 and has a weighted portion 23a on its outer end which is disposed at an angle to the vertical so that gravity will bias gate 21 to the closed position. Handle 23 may be grasped and moved upwardly to pivot gate 21 downwardly to permit access to the interior of the container. Also, gate 21 may be moved downwardly by merely pressing on the upper surface thereof with the weighted handle 23 returning the same to closed position when such force is removed.

Each of the end walls 15 and 16 has an opening 24, 25, respectively (FIGURES 2, 6 and 8), in the lower portion thereof. Openings 24 and 25 are divided into two sections by cross members 26, 27, respectively, which extend diametrically across the openings. Cross members 26 and 27 have enlarged medial portions with internally threaded openings therein. Bolts 30, 31 are mounted at one end in these openings and extend outwardly from cross members 26, 27, respectively. Wing nuts 32, 33 are mounted on bolts 30, 31, respectively, for suitable adjustment toward and away from end walls 15 and 16 and include base portions 32a, 33a of an exterior diameter larger than the diameter of openings 24, 25. Suitable valve seats 34, 35 are formed integral with end walls 15, 16 and protrude outwardly therefrom.

It is noted that openings 24, 25, wing nuts 32, 33 and valve seats 34, 35 cooperate to define valve mechanisms for controlling the flow of water into and out of container 10. It is further noted that when such valve mechanisms are open, i.e. the base portions 32a and 33a are not seated against valve seats 34 and 35, base portions 32a and 33a shield openings 24 and 25 from the direct flow of water into the interior of the container, but permit indirect flow of such water thereinto to prevent undue turbulence from occurring in container 10, which turbulence would have a deleterious effect on the live bait therein.

An aerating device 40 (FIGURE 2) is carried by end wall 15 and comprises an air scoop 41 formed integral with end wall 15 and includes an outer portion extending outwardly therefrom and an inner portion extending into the interior of the main chamber. It is noted that the outer portion of air scoop 41 preferably does not extend outwardly from end wall 15 beyond the outer end of bolt 30 so that the outer dimensions of container 10 are not increased by air scoop 41. Air scoop 41 is preferably funnel-shape, i.e. has an opening extending therethrough which progressively decreases in cross-sectional area from its inlet end at the outer end of air scoop 41 to its outlet end at the inner end thereof within the interior of container 10.

A flexible conduit 42 (FIGURE 2) preferably in the form of a hose of suitable elastomeric material, is connected at one end to the inner end of air scoop 41 by a clamp 43. Flexible conduit 42 terminates at its other end in an open free end portion.

A float 44 is connected to a strap 45 which in turn is connected to the open free end portion of flexible conduit 42. Float 44 is of a predetermined buoyancy sufficient to maintain the open free end portion of flexible conduit 42 at a predetermined depth in water W contained in container 10. It is noted that flexible conduit 42 is of such length that regardless of the level of the water in container 10, the same is maintained at the predetermined depth by float 44. For example, the dotted line showing in FIGURE 2 illustrates another position of float 44 and the free end portion of flexible conduit 42 for a different level of water in container 10.

A pair of spaced apart annular flanges 46, 47 (FIGURE 7) are formed integral with air scoop 41 at a medial portion thereof and define therebetween a screen mounting groove. A foraminous screen 50 is mounted between the flanges 46 and 47 and completely covers the opening through air scoop 41 at this point. Screen 50 serves to filter out the larger impurities from the air stream passing through air scoop 41 and flexible conduit 42.

An auxiliary chamber 51 adapted to contain a supply of an air coolant, preferably fresh water, is defined by the upper portion of end wall 15, one end portion of top wall 11, the upper corner portions of side walls 13, 14 adjacent end wall 15, a bottom wall 52 and an end wall 53. Said one end portion of top wall 11 has an opening 54 therethrough and has an upstanding, externally threaded boss 55 surrounding opening 54. A fill cap 56 is removably mounted on boss 55 and has a vent opening 57 therethrough to permit air to be admitted to the interior of auxiliary chamber 51.

End wall 15 has an opening therein which communicates with the interior of auxiliary chamber 51 adjacent to bottom wall 52 and in which is disposed one leg 60a of an inverted L-shaped conduit 60 (FIGURES 2 and 7). The other leg 60b of conduit 60 extends downwardly through a suitable opening formed in air scoop 41 and terminates forwardly of but adjacent to screen 50. Conduit 60 has a crimped portion 60c in leg 60b adjacent the junction point of legs 60a and 60b which reduces the diameter of the opening therethrough at this point.

A valve member 61 is disposed in leg 60b of conduit 60 and extends downwardly therefrom to a point adjacent a medial portion of screen 50. It is noted that valve member 61 is of the same diameter as the diameter of the opening through conduit 60 at the crimped portion 60c. Therefore, valve memer 61 may be pushed upwardly to position the end thereof in the reduced opening at the crimped portion 60c to close conduit 60 to the passage of water therethrough. Valve member 61 has a lateral crimped portion 61a adjacent the upper end thereof which engages the walls of the opening through leg 60b of conduit 60 to frictionally retain the valve member therein. When the end of valve member 61 is not disposed in portion 60c, water flows outwardly along leg 60a of conduit 60 and then downwardly along leg 60b and then along valve member 61 and falls from the lower end thereof in droplet form D (FIGURE 7) into the air stream passing through air scoop 41.

A third opening 63 (FIGURE 2) is formed in top wall 11 at the end thereof opposite from the opening 54 and defines a second access opening into the interior of container 10. Opening 63 is normally closed by a door 64 (FIGURES 1 and 2) pivotally mounted by a hinge 65 mounted on the top wall 11. Door 64 is of sufficient length such that the same projects outwardly beyond end wall 16 to facilitate movement thereof to the open position.

A pair of vertically extending elongate rib members 70, 71 are formed integral with side walls 13 and 14, respectively, and extend inwardly therefrom in spaced relation to end wall 16. Ribs 70, 71 are also formed integral with top wall 11 and bottom wall 12 at their opposite ends. A pair of horizontally disposed, elongate ribs 72, 73 (FIGURE 5) are formed integral with bottom wall 12 along one side thereof and end wall 16 at one of their ends. It is noted that ribs 72 and 73 are disposed perpendicular to ribs 70, 71 and support a foraminous basket member 74 (FIGURES 2 and 5) above bottom wall 12 a sufficient distance to prevent minnows from becoming trapped beneath the basket when the same is inserted into container 10.

Basket 74 has an open top and a closed bottom and is rectangular in cross section and of substantially the same exterior dimensions as the dimensions of openings 63. It is noted that basket 74 is maintained in upright position by vertical ribs 70, 71 and is contained thereby beneath opening 63.

Basket 74 has a trap opening 75 in one side thereof at an elevation above ribs 72, 73 generally corresponding to the elevation of opening 25 such that trap opening 75 is disposed generally opposite opening 25 when basket 74 is positioned within container 10. Trap opening 75 is defined by a generally circular wall of the foraminous material forming basket 74 which extends into the interior of basket 74 a short distance to substantially prevent the live bait which enters the basket through trap opening 75 from finding its way back out through the trap opening 75. Basket 74 includes a bail 76 at its upper portion for facilitating its removal from container 10 to provide a readily accessible supply of the bait to the user.

It is noted that basket 74 is reversible in container 10 to position trap opening 75 adjacent end wall 16 to close the same to the entry of bait thereinto to prevent the live bait within the basket from becoming overcrowded which would have a deleterious effect thereon. It is further noted that openings 77 are provided in door 64 and openings 78 are provided in the upper portions of end wall 16 and the adjacent portions of side walls 13 and 14 to admit light into container 10 in the area in which basket 74 is disposed to attract the live bait to this area so that the same will enter basket 74 through trap opening 75.

Mounting means for bait container 10 comprises a pair of spaced apart, vertical standards 80, 81 (FIGURE 3) mounted on side wall 13 by a pair of U-shaped straps 82, 83 having the end portions of the legs thereof penetrating through suitable openings formed in standards 80, 81 and being held therein by suitable nuts 84, 85. Straps 82, 83 are disposed around container 10 with the legs thereof above and below top and bottom walls 11, 12 and the bight portions thereof disposed vertically along side wall 14. Standards 80 and 81 extend upwardly above top wall 11 and each have a pair of spaced apart openings 86, 87 therein, respectively. A clamp member 88 having inverted L-shaped legs is connected by a connecting portion at one end and having the other ends thereof penetrating through one of the openings 86, 87 in standards 80, 81, respectively, with the end portions of these legs being suitably threaded and having wing nuts 89 thereon. Clamp member 88 is adapted to have the vertical portions of the legs and the connecting portion thereof to extend downwardly on the opposite side of a door of an automobile C (as indicated in dash lines in FIGURE 1) to clamp container 10 to the exterior of the car or in similar manner to a boat (FIGURE 4). It is noted that clamp member 88 may be covered by suitable resilient covering material (not shown) to prevent marring of the surface engaged thereby.

A pair of suction cups 90, 91 (FIGURE 5) are mounted on the bight portions of U-shaped brackets 92, 93 by suitable brads or rivets and the leg portions of brackets 92, 93 straddle standards 80 and 81, respectively, and are secured thereto by suitable bolts or rivets 94, 95. It is noted that the suction cups 90, 91 are thereby mounted for pivotal movement about the horizontally disposed bolts 94, 95 to accommodate the varying curvatures of the sides of the various types of boats or the like.

Float blocks 96, 97 (FIGURE 5) are mounted on side walls 13 and 14, respectively, by any suitable means, such as adhesives or the like (not shown). Blocks 96, 97 are constructed of a buoyant material for imparting buoyancy to container 10, such that the same may float freely in water without sinking.

In operation, when it is desired to transport live bait, such as minnows, shrimp and the like to the fishing site, water is placed in container 10 preferably to a level between openings 24 and 25 and the inner end of air scoop 41. Prior to placement of the water within the container 10, openings 24, 25 are of course closed by suitable rotation of wing nuts 32, 33 relative to bolts 30, 31 to seat the base portions 32a, 33a thereof against the valve seats 34, 35.

The live bait is then disposed within the container 10 through access opening 20 and the bait container is mounted on the exterior of an automobile with air scoop 41 pointing in the direction of travel thereof. In the embodiment illustrated in the drawings, the bait container would therefore be mounted on the left-hand side of an automobile (FIGURE 1).

With a fresh supply of water contained within the auxiliary chamber 51, valve member 61 is moved downwardly relative to conduit 60 to move the upper end thereof from within the crimped portion 60c of conduit 60 such that fresh water or air coolant may flow from the auxiliary chamber 51 along conduit 60 and then downwardly along valve member 61. As container 10 moves with the automobile C, an air stream is captured by air scoop 41 and is transmitted into the interior of container 10 past valve member 61.

It is noted that the air stream picks up the droplets of water from valve member 61 and carries the same rearwardly against screen 50. Screen 50 filters out the larger impurities from the air stream, and at the same time, breaks up the droplets of water into finer particles (FIGURE 2) which are more readily evaporated by the air stream, and therefore serve to more efficiently cool the air stream prior to its entry into container 10.

The thusly cooled air stream passes through flexible conduit 42 and out of the open free end portion thereof which is maintained at the optimum depth within the water in container 10 by float 44 to provide the desired degree of agitation of the water to permit the water to absorb the maximum amount of oxygen from the air stream. It is noted that if the open free end portion of flexible conduit 42 is disposed at too shallow a depth, the air stream escapes from the water too quickly and insufficient oxygen is absorbed by the water to replenish the oxygen used by the bait. Further, if the open free end portion of flexible conduit 42 is disposed at too great a depth, the pressure of the water prevents sufficient agitation of the water by the air stream to provide good aeration thereof and thereby substantially decreases the efficiency of aerating device 40.

While the container 10 is being transported to the fishing site, basket 74 is disposed within container 10 with the trap opening 75 disposed remote from end wall 16 such that minnows or the like may enter into basket 74 therethrough and be trapped therein. Therefore, a readily accessible supply of bait is provided when the fishing site is reached.

When the fishing site is reached, container 10 is removed from the automobile and is then attached to the side of a boat with air scoop 41 pointing in the opposite direction from the direction of travel thereof. In the embodiment illustrated in the drawings, container 10 is mounted on the right-hand side of the boat with end wall 16 pointing in the direction of travel. Openings 24 and 25 are then opened by suitable rotation of wing nuts 32, 33 to open position to permit water to flow into and out of openings 24, 25.

It is noted that the base portions 32a and 33a are of a larger diameter than openings 24 and 25 such that these base portions shield openings 24 and 25 against the direct flow of water into and out of container 10 (FIGURE 8). This shielding of openings 24 and 25 prevents undue turbulence being created in the water within container 10 and therefore prevents such turbulence from having a deleterious effect upon the live bait contained therein. Since aerating means 40 is no longer being used, the flow of water from auxiliary chamber 51 to air scoop 41 may now be terminated by moving valve member 61 upwardly to position the upper end thereof in the crimped portion 60c of conduit 60.

When it is desired to remove bait from container 10, door 64 is moved to the open position, and basket 74 is removed from container 10. It is noted that basket 74 has trapped some of the bait therein which then is readily grasped by the person using the apparatus. If basket 74 is not full of bait, the basket may be replaced with trap opening 75 remote from end wall 16 to permit the live bait to enter thereinto and to be trapped therein. If basket 74 is full, the same may be positioned in container 10 with the trap opening adjacent end wall 16 to close the opening and prevent the entry of any more bait into basket 74.

It is noted that bait container 10 may be utilized to maintain bait in a live condition in the absence of an automobile or a boat by positioning container 10 in water with float blocks 96, 97 maintaining the same in a free floating state. It is noted that container 10 should then be tethered to the fisherman or a stationary object and will then float freely while permitting fresh water to enter through openings 24 and 25.

While the container 10 of the present invention has been described as being for the purpose of maintaining bait in a live condition, it should be understood that container 10 may be used as a live fish container for maintaining the caught fish alive at the fishing site and during transport from the fishing site to a point a considerable distance therefrom without departing from the scope of the present invention. In this regard, the basket 74 may be removed to provide more space in the main chamber for the caught fish.

It will therefore be apparent that a very versatile bait container is provided wherein live bait is maintained in a live condition both in transit to the fishing site and at the fishing site. To accomplish this result, a cool air stream is admitted to water in the container during the transit of the bait to the fishing site and, at the fishing site, a fresh supply of water is constantly admitted to the interior of the container, which admittance is in an indirect path of flow to prevent undue turbulences being created in the container.

In the drawings and specification there has been set forth a preferred embodiment of the invention and, although specific terms are employed, they are used in a generic and descriptive sense only and not for purposes of limitation, the scope of the invention being defined in the claims.

I claim:

1. A container for live bait, such as minnows, shrimp and the like, comprising
   (a) top, bottom, side and end walls defining a chamber adapted to contain water and the live bait therein,
   (b) air scoop means carried by one of said end walls and communicating with the upper portion of said chamber at a point above the level at which the water is adapted to be contained therein,
   (c) conduit means connected to the inner end of said air scoop means and extending outwardly and downwardly therefrom and terminating in an open free end portion,
   (d) means operatively connected to said free end portion of said conduit means for maintaining the same at a predetermined depth below the surface of the water contained in the chamber at all times regardless of the amount of water therein for controlling agitaof the water and for optimum aeration thereof,
   (e) means operatively connected to said air scoop means for dispensing an air coolant directly into an air stream passing therethrough prior to its delivery to the water in said container for cooling the air stream to cool the water in the container to maintain the bait alive, and
   (f) mounting means operatively associated with said container and engageable with a vehicle for mounting said container on the exterior of said vehicle with said air scoop means pointing in the direction of travel of said vehicle so that upon movement of said vehicle said air scoop means captures an air stream and directs the same into said conduit means which delivers the air stream to the water contained in said container at the predetermined optimum depth for aerating the water to maintain the bait in a live condition during transport to a fishing site.

2. A container for live bait such as minnows, shrimp and the like, comprising
   (a) top, bottom, side and end walls defining a chamber adapted to contain water and live bait therein, said top wall having at least one opening therein providing access to the chamber,
   (b) air scoop means carried by one of said end walls and communicating with the upper portion of said chamber above the level at which the water is adapted to be contained therein,
   (c) a flexible conduit connected at one end to said air scoop means and extending outwardly and downwardly therefrom and terminating in an open free end portion,
   (d) float means connected to said open free end portion of said flexible conduit and being of a predetermined buoyancy for maintaining said open free end portion at a predetermined depth below the surface of the water adapted to be contained within the chamber at all times regardless of the amount of water therein,
   (e) means operatively connected to said air scoop means for dispensing metered quantities of fresh water into an air stream passing through said air scoop means into the interior of said container for cooling the air stream by evaporation of the fresh water to cool the water in said chamber to maintain the bait alive, and
   (f) mounting means engageable with a vehicle for mounting said container on the exterior of the vehicle with said air scoop means pointing in the direction of travel thereof so that upon movement of said vehicle an air stream is captured by said air scoop means, is cooled by the evaporation of the metered quantities of fresh water and is directed by said conduit means into said container for cooling and aerating the water when the same is contained therein to maintain the bait in a live condition during transport to a fishing site.

3. The structure set forth in claim 2 wherein said dispensing means (d) comprises
   (1) means defining an auxiliary chamber within said container above said air scoop means, said auxiliary chamber being adapted to contain a supply of fresh water therein,
   (2) conduit means connecting said auxiliary chamber to said air scoop means, and
   (3) valve means operatively connected to said conduit means for metering the flow of fresh water to said air scoop means.

4. The structure set forth in claim 2 wherein said metered quantities of fresh water are dispensed into said air scoop means in droplet form, and wherein said air scoop means includes screen means for screening out impurities in the air passing therethrough and to break up the fresh water droplets into smaller particles which are more readily evaporated by the air stream passing through said air scoop means to give a more efficient cooling of the air.

5. A container for live bait, such as minnows, shrimp and the like, comprising
   (a) top, bottom, side and end walls defining a chamber adapted to contain water and the live bait therein, each of said end walls having an opening in the lower portion thereof in spaced relation to said bottom wall,
   (b) mounting means operatively associated with said container and adapted to engage one side of a boat for mounting said container on the exterior of the boat with a portion of said container including the openings in said end walls adapted to be submerged in water alongside the boat, and
   (c) valve means mounted on said end walls at each of said openings and movable between closed and open positions, said valve means being of larger size than the openings through said end walls to prevent the direct flow of water into and through the openings into the container when said valve means are in open position to thereby prevent undue turbulence being created in the water within the container.

6. The structure recited in claim 5 wherein each of said valve means comprises a bolt mounted on said end walls at said opening and extending outwardly therefrom, and nut means mounted on said bolt and having a larger outer diameter than the diameter of the openings in said end walls and being rotatable relative to said bolt means for movement out of and into engagement with said end walls and thus between open and closed positions, said nut means when in open position shielding said openings to the direct flow of water thereinto to prevent undue turbulence being created in the water in the container, but permitting indirect flow of water thereinto to provide a fresh supply of water to maintain the bait in a live condition.

7. The structure set forth in claim 5 wherein said mounting means comprises a pair of spaced apart standards mounted on one of said side walls and extending above said top wall, a clamp member mounted on said standard at one end and extending outwardly and then downwardly therefrom, means connected to said clamp member for adjusting the distance between the downwardly extending portion thereof and said vertical standards, and a pair of suction members pivotally mounted on said standards in spaced relation to said clamp member for movement about a horizontal transverse pivot to accommodate varying curvatures of the sides of various types of boats so that said suction members will properly engage these sides of the boat to mount said container thereon.

8. The structure set forth in claim 5 wherein said top wall has an opening therein adjacent one of the end walls to provide access into said container and including a foraminous basket member removably disposed in said chamber beneath said access opening in the top wall, said basket member having a trap opening in the lower portion of one side thereof and adapted to be disposed at a lower elevation than the surface of water contained within said chamber and through which the live bait may pass when said basket member is disposed with the trap opening remote from the adjacent end wall for ease in the removal of bait from the container for use, said basket member being removably reversible to position the trap opening therein in close proximity to the adjacent end wall to shield the trap opening to the entrance of live bait therethrough.

9. A container for live bait, such as minnows, shrimp and the like, comprising
(a) top, bottom, side and end walls defining a chamber adapted to contain water and the live bait therein, each of said end walls having an opening in the lower portion thereof in spaced relation to said bottom wall,
(b) valve means mounted on said end walls at each of said openings and extending exteriorly thereof and movable between an open position wherein water is permitted to flow into the interior of said container when said container is partially submerged in water and a closed position wherein the lower portion of said container is rendered watertight and is adapted to contain water therein, said valve means being of a larger exterior diameter than the openings in said end walls to prevent the direct flow of water into and through the openings into the container when said valve means are in open position to thereby prevent undue turbulence being created in the water within the container,
(c) air scoop means carried by one of said end walls and communicating with the upper portion of said chamber above the level at which water is adapted to be contained therein, said air scoop means capturing a stream of air upon movement of said container in the direction in which the same is facing,
(d) flexible conduit means connected at one end to said air scoop means and terminating in an open free end portion at its other end,
(e) float means connected to said open free end portion of said conduit means and being of a predetermined buoyancy for maintaining said open free end portion at a predetermined depth in the water contained within said chamber regardless of the level of the water in the chamber,
(f) means operatively associated with said air scoop means for dispensing an air coolant into the air stream passing through said air scoop means for cooling the air stream prior to its delivery into the chamber, and
(g) mounting means carried by one of said side walls and selectively engageable with a vehicle for mounting said container on the exterior of the vehicle with said air scoop means facing in the direction of travel of the vehicle for transporting the container to the fishing site while aerating and cooling the water in the container and engageable with one side of a boat disposed in water for mounting said container on the exterior of the boat with a portion of the container including the openings in said end walls being submerged in the water for permitting fresh water to flow into the container when said valve means are in open position.

References Cited by the Examiner
UNITED STATES PATENTS

| 163,498 | 5/75 | Kepner | 43—56 |
| 597,249 | 1/98 | Smith | 119—5 |
| 1,444,412 | 2/23 | Codner | 43—57 |
| 1,801,117 | 4/31 | Smith | 43—56 |
| 1,991,149 | 2/35 | Hailslip | 43—56 |
| 2,268,071 | 12/41 | Grange | 43—56 |
| 2,738,613 | 3/56 | Styer | 43—56 |
| 2,765,577 | 10/56 | Scruggs | 43—55 |

FOREIGN PATENTS 1,175,727  11/58  France.

ABRAHAM G. STONE, *Primary Examiner.*